United States Patent [19]
Engle et al.

[11] Patent Number: 5,957,713
[45] Date of Patent: Sep. 28, 1999

[54] ELECTRIC CONTACT ARRANGEMENT FOR HOSE COUPLING

[75] Inventors: Thomas H. Engle; Thomas Bogenschutz, both of Clayton, N.Y.

[73] Assignee: Westinghouse Air Brake Company, Wilmerding, Pa.

[21] Appl. No.: 08/803,262

[22] Filed: Feb. 20, 1997

[51] Int. Cl.$^6$ ................................................ H01R 4/60
[52] U.S. Cl. .............................................................. 439/195
[58] Field of Search ..................................... 439/190, 191, 439/192, 194, 195, 35, 197, 286, 193; 213/1.3, 76

[56] References Cited

U.S. PATENT DOCUMENTS

| | | | |
|---|---|---|---|
| 341,128 | 5/1886 | Burton | 439/195 |
| 343,515 | 6/1886 | Burton | 439/195 |
| 370,605 | 9/1887 | Carpenter | 439/195 |
| 5,762,504 | 6/1998 | Itoh | 439/197 |

*Primary Examiner*—Neil Abrams
*Assistant Examiner*—Brian J. Biggi
*Attorney, Agent, or Firm*—James Ray & Associates

[57] ABSTRACT

Connector for joining a fluid conduit and an electrical line to another fluid conduit and electrical line. It has a body including a mating surface with a fluid pressure port and a seal surrounding the port. It has a nipple for a fluid pressure hose and a fluid passage joining the nipple to the port. It has means for joining two connectors having their mating surfaces in contact to compress the seals and prevent loss of fluid. There is at least one electrical contact having a contact surface on the mating surface outside of the seal, so that when two connectors are joined, the contact surface(s) on the first connector touch(es) the contact surface(s) on the second connector. It also has an enclosed pathway communicating pressure from an internal portion of the connector to a portion of the electrical contact opposite the contact surface, and it has a second seal preventing flow of fluid past the contact, the second seal permitting motion of the electrical contact in a direction having a component normal to the electrical contact surface so that fluid pressure carried by the enclosed pathway causes the electrical contact to press against an adjacent electrical contact on the second connector. It has electrical connection means attached to the contact (s). The electrical connection means pass through the pathway and through a pressure boundary of the connector, and are for connection to the electrical line.

20 Claims, 2 Drawing Sheets

ELECTRIC CONTACT ARRANGEMENT FOR HOSE COUPLING

CROSS-REFERENCE TO RELATED APPLICATIONS

The present invention is closely related to the following co-pending application entitled "Hose Coupling with Electrical Contacts", which is being filed concurrently with the present application. It is assigned to the assignee of the present invention. Additionally, the teachings in this patent application are incorporated herein by reference thereto.

FIELD OF THE INVENTION

This invention applies to the provision of electrical interconnections between railway cars and, most particularly, the invention applies to the addition of electrical interconnection to the standard connector for the air line of the air brake system.

BACKGROUND OF THE INVENTION

Electrical interconnections between railway vehicles may be used for numerous purposes which include: voice intercom, rapid air brake application and release, power for electric lighting, control of remote locomotives, diagnostics such as information regarding hotboxes and other purposes. With the availability of modern microprocessors comes the possibility of enabling a microprocessor in a lead locomotive of a train to control the tractive power and braking of slave locomotives and communicate individually or collectively with all the cars in the train. A number of such purposes can be served with a small number of electrical connections because different functions can be accomplished by using different portions of the frequency spectrum. An example is a home intercom which sends an audio signal over the power lines of the house.

The following five U.S. patents relate to the art of making electrical connections between electric lines in adjacent railway cars.

U.S. Pat. No. 3,251,480, issued to K. L. DePenti et al on May 17, 1966. This patent provides a connector for automatic connection of fluid pressure conduits and electrical circuits. The connector is located underneath the coupler and joining of the connectors is intended to occur automatically as the cars are coupled. This system is inconsistent with the industry standard brake line fluid pressure connector.

U.S. Pat. No. 3,646,498, issued to R. T. Reed et al on Feb. 29, 1972. This is an electrical connector which is not associated with a fluid pressure connector. Electrical contacts are embedded in insulating blocks and are brought into electrical contact by pins activated when the connectors are joined.

U.S. Pat. No. 3,773,186, issued to W. H. Reno et al on Nov. 20, 1973. This patent has contacts in bores which are placed in electrical contact by fluid pressure.

U.S. Pat. No. 3,812,444, issued to W. H. Reno on May 21, 1974. This is a combined fluid pressure connector and electrical connector which is inconsistent with the industry standard brake line fluid pressure connector.

U.S. Pat. No. 5,586,668, issued to Craig A. Miller. This patent is assigned to the assignee of the present invention. It provides an integrated air and electrical connector which is consistent with the industry standard brake line fluid pressure connector. In this invention, the electrical contacts are pressed against each other by resilient biasing members. The teachings of this patent are herein incorporated by reference thereto.

SUMMARY OF THE INVENTION

The present invention provides an electropneumatic connector in which pneumatic forces are used to press electrical contacts against one another to provide improved electrical contact.

OBJECTS OF THE INVENTION

It is, therefore, one of the primary objects of the present invention to provide a brake line fluid connector which additionally provides connection for one or more electrical connection.

It is, therefore, one of the primary objects of the present invention to provide a brake line fluid connector which additionally provides connection for one or more electrical connection, and which is consistent with the industry standard "gladhand" which is used to connect the brake air lines of coupled railway vehicles.

Still another object of the present invention is to provide a combined pneumatic and electrical connector in which air pressure carried by the pneumatic pathway is used to press the electrical connectors into contact with each to provide improved electrical contact.

Yet another object of the present invention is to provide combined pneumatic and electrical connectors which are joined by the same motions as the present industry standard gladhand, and which pull apart, as do the present connectors, when cars are separated.

A further object of the present invention is to provide a combined pneumatic and electrical connector for use in railway vehicles in which the electrical contacts are reliable enough to reliably carry an electrical current down the full length of a modern freight train.

In addition to the various objects and advantages of the present invention which have been generally described above, there will be various other objects and advantages of the invention that will become more readily apparent to those persons who are skilled in the relevant art from the following more detailed description of such invention, particularly, when such detailed description is taken in conjunction with the attached drawing figures and with the appended claims.

BRIEF DESCRIPTION OF THE PRESENTLY PREFERRED AND VARIOUS ALTERNATIVE EMBODIMENTS OF THE INVENTION

Figure 1:
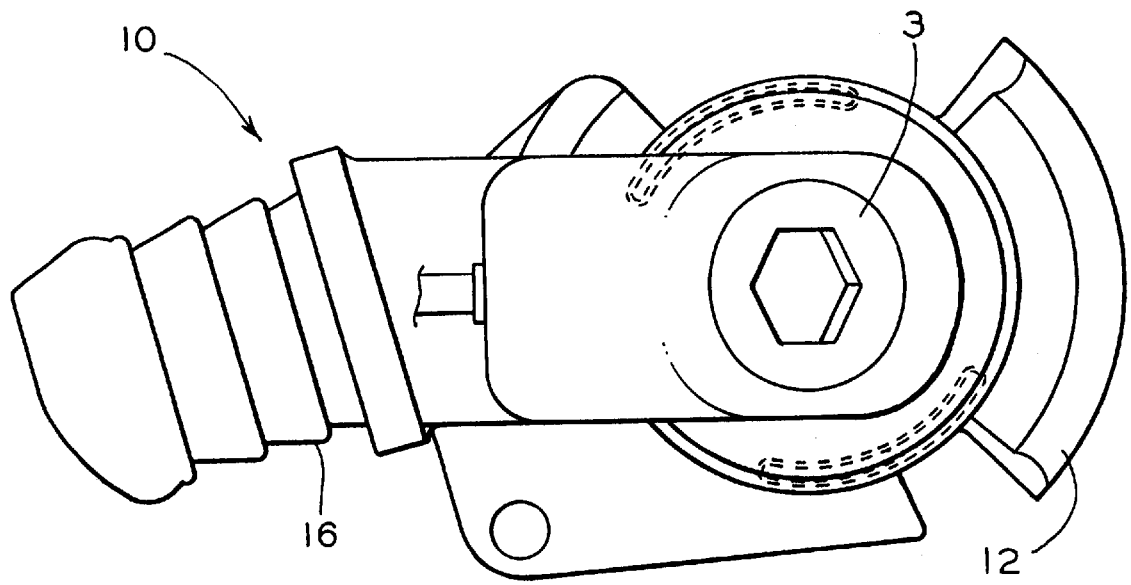
FIG. 1 shows a view of the gladhand from the side of the gladhand opposite the mating surface.
Figure 2:
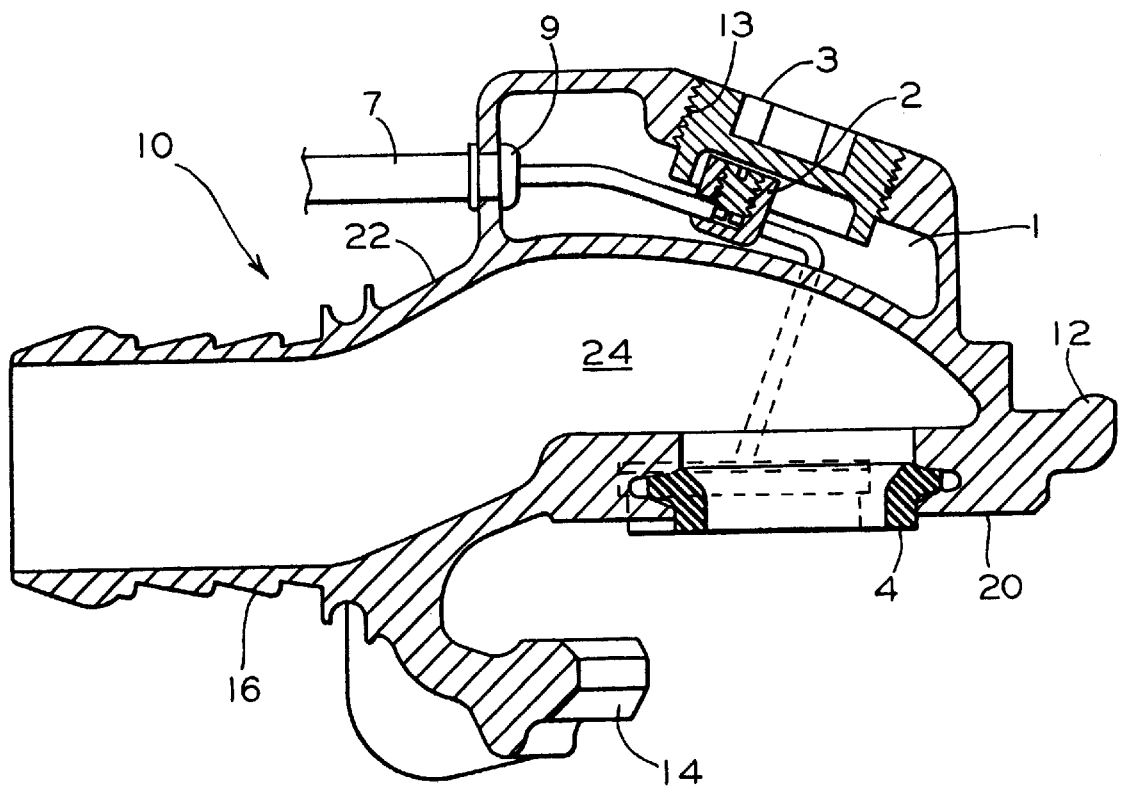
FIG. 2 shows a section of the gladhand cut through the center of the air pressure communication passage.
Figure 3:
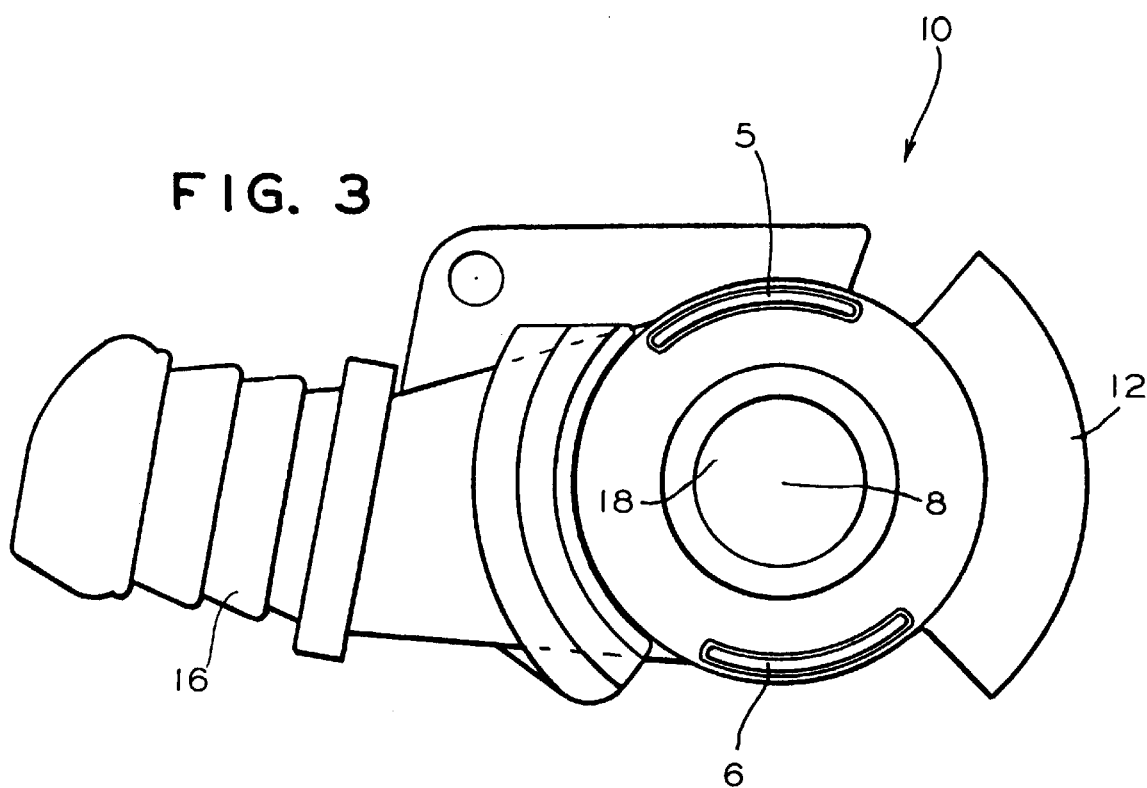
FIG. 3 shows a view of the gladhand facing the mating surface.
Figure 4:
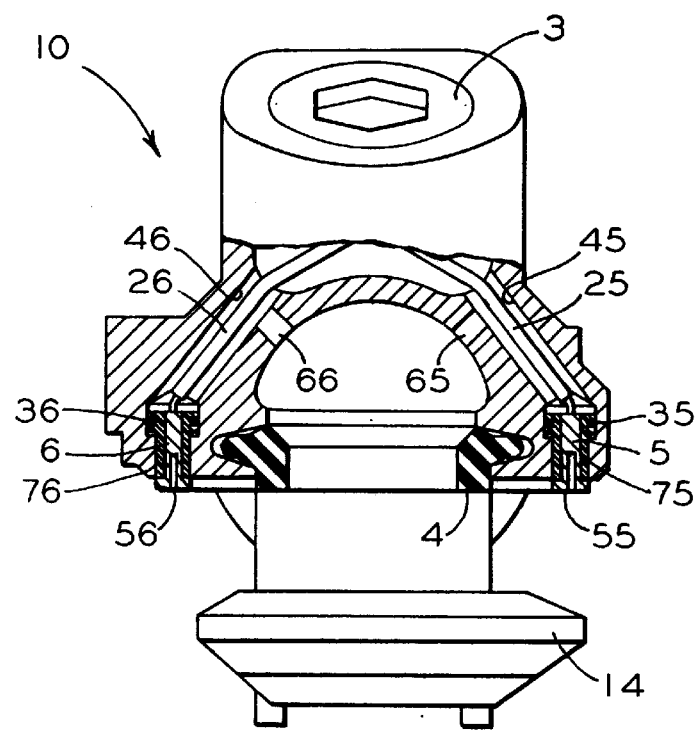
FIG. 4 shows a section cut through the gladhand normal to the mating surface, viewed from the right side of FIG. 2.

Prior to proceeding to the much more detailed description of the present invention, it should be noted that identical components which have identical functions have been identified with identical reference numerals throughout the several views illustrated in the drawing figures, for the sake of clarity and understanding of the invention. FIGS. 1, 2, 3 and 4 show various views and sections of a presently preferred embodiment of the invention. Connector 10 is for joining a brake air line on one railway vehicle to a brake air line on an adjacent railway vehicle and also to connect one or more electrical trainlines on the first railway vehicle to similar line(s) on the adjacent railway vehicle. The connector 10 has connector body 22 which is formed to mate with the AAR standard gladhand. Connector 10 also can be mated with a like connector to connect electrical trainlines as well as brake air lines. It has a nipple 16 for attachment of the brake air hose and fluid pressure port 18 surrounded by seal 4 on mating surface 20. In the presently preferred embodiment, port 18 is circular and has center 8, as shown in FIG. 3. These are connected by air pressure communication passage 24. Connector 10 has means for joining two connectors 10 disposed with their mating surfaces 20 in contact whereby force is applied across mating surfaces 20 so that first seal 4 on one of said connectors 10 is compressed and pressed against a first seal 4 on a second one of said connectors 10 thereby preventing air loss between the connectors 10. In the presently preferred embodiment, the "means for joining" consists of a first arcuate flange 14 and a second arcuate flange 12, the first arcuate flange 14 on one gladhand for connecting with the second arcuate flange 12 on the other gladhand.

The connector 10 has electrical contacts 5 and 6. These are connected by electrical connection means, preferably electric conductors 25 and 26 through enclosed pathways 45 and 46 to junction 2, where they are connected to external cable 7. Electrical contact 5 has contact surface 55 and contact 6 has contact surface 56. In the presently preferred embodiment shown, connector body 22 is made of an electrically conductive material, and it is insulated from contact 5 by insulating insert 75. Also, in the preferred case, connector body 22 is insulated from contact 6 by insulating insert 76.

Junction 2 is contained in junction chamber 1 which communicates with passage 24 through apertures 65 and 66 and portions of enclosed pathways 45 and 46. External cable 7 passes through the pressure boundary of junction chamber 1 at seal 9. Junction chamber 1 has access port 13 and plug 3.

Plug 3 is removable for servicing of junction 2 and is sealed to prevent air loss. Electrical contacts 5 and 6 are subjected to the pressure inside the air pressure communication passage 24 through the pathways 45 and 46 formed for electric conductors 25 and 26. Contact 5 has a seal 35 to prevent loss of fluid pressure from enclosed pathway 45. Seal 35 permits contact 5 to be moved by pressure in enclosed pathway 45 in a direction having a component normal to contact surface 55. Hence, pressure in enclosed pathway 45 presses contact 5 against an adjacent contact on another connector. Likewise, contact 6 has a seal 36 to prevent loss of fluid pressure from enclosed pathway 46. Seal 36 permits contact 6 to be moved by pressure in enclosed pathway 46 in a direction having a component normal to contact surface 56. Hence, pressure in enclosed pathway 46 presses contact 6 against an adjacent contact on a similar connector. Pressure in communication passage 24 is communicated to enclosed pathway 45 through aperture 65. In the presently preferred embodiment shown, aperture 65 and a portion of enclosed pathway 45 also communicate pressure from communication passage 24 to junction chamber 1. Pressure in communication passage 24 is communicated to enclosed pathway 46 through aperture 66. In the presently preferred embodiment shown, aperture 66 and a portion of enclosed pathway 46 also communicate pressure from communication passage 24 to junction chamber 1.

While a presently preferred and various additional alternative embodiments of the instant invention have been described in detail above in accordance the patent statutes, it should be recognized that various other modifications and adaptations of the invention may be made by those persons who are skilled in the relevant art without departing from either the spirit or the scope of the appended claims.

We claim:

1. A connector for joining an air pressure communication conduit and at least one electrical trainline on a first railway vehicle to a like connector on a second railway vehicle coupled to such first railway vehicle, said connector comprising:

(a) a connector body including;
  (I) a mating surface for mating two like connectors, said mating surface having an air pressure port and a first seal surrounding said air pressure port;
  (II) a nipple for attachment of an air pressure hose, said connector body having formed therein an air pressure communication passage joining said nipple to said air pressure port;
  (III) means for mechanically joining said two like connectors disposed with said mating surface of a first one of said two like connectors in contact with a corresponding mating surface of a second one of said two like connectors whereby force is applied across their said mating surfaces so that said first seal on said first one of said two like connectors is compressed and pressed against a corresponding seal on said second one of said two like connectors thereby preventing loss of air from said two like connectors;

(b) at least one electrical contact having an electrical contact surface located on said mating surface outside of a pressure boundary provided by said first seal, so that when said first like connector is joined to said second like connector, said at least one electrical contact surface on said first like connector makes interconnection with said at least one electrical contact surface on said second like connector;

(c) at least one enclosed pathway communicating air pressure from an internal portion of said connector to a portion of said electrical contact opposite said electrical contact surface;

(d) a second seal preventing flow of air past said electrical contact, said second seal permitting motion of said electrical contact in a direction having a component normal to said electrical contact surface so that such air pressure carried by said enclosed pathway causes said electrical contact to press against an adjacent electrical contact on said second like connector; and (e) electrical connection means attached to said portion of said electrical contact opposite said electrical contact surface, said electrical connection means passing through at least a portion of said enclosed pathway and through a pressure boundary of said connector, said electrical connection means for connection to said at least one electrical trainline.

2. A connector according to claim 1 wherein said air pressure port is circular and said at least one electrical contact is formed as an arcuate member having an arc center at a center of said air pressure port so that a pair of mated connectors can maintain electrical contact through a range of relative angular positions.

3. A connector according to claim 2 wherein said at least one electrical contact comprises a set of electrical contacts disposed at a common radius from said center of said air pressure port.

4. A connector according to claim 3 wherein said set of electrical contacts comprises two electrical contacts, said two electrical contacts placed in positions diametrically opposite each other relative to said center of said air pressure port.

5. A connector according to claim 1 wherein said electrical connection means is further characterized as including a first electrical conductor connected to said electrical contact and a second electrical conductor passing through said pressure boundary of said connector through an airtight seal, said first electrical conductor connected to said second electrical conductor at an electrical junction.

6. A connector according to claim 3 wherein said connector body has an access port for access to said electrical junction so that said first electrical conductor may be replaced and connected to said second electrical conductor.

7. A connector according to claim 6 wherein said access port has a removable air tight closure means.

8. A connector according to claim 3 further having a junction chamber for containing said electrical junction, said junction chamber communicating with said air pressure communication passage through a relatively small port in an otherwise generally smooth wall so that said first electrical conductors said second electrical conductor and said electrical junction do not interfere with airflow through said connector and so that debris carried by said airflow does not damage said first electrical conductor, said second electrical conductor nor said electrical junction.

9. A connector according to claim 1 wherein said connector body is made of a material which is electrically non-conducting.

10. A connector according to claim 1 wherein said connector body is made of a material which conducts electricity, said connector further comprising an insulating insert between said at least one electrical contact and said connector body.

11. A connector for joining a fluid pressure communication conduit and at least one electrical communication line to a like fluid pressure communication conduit and a like at least one electrical communication line, said connector comprising:
(a) a connector body including;
(I) a mating surface for mating two like connectors, said mating surface having a fluid pressure port and a first seal surrounding said fluid pressure port;
(II) a nipple for attachment of a fluid pressure hose, said connector body having formed therein a fluid pressure communication passage joining said nipple to said fluid pressure port;
(III) means for mechanically joining said two like connectors disposed with said mating surface of a first one of said two like connectors in contact with a corresponding mating surface of a second one of said two like connectors whereby force is applied across their said mating surfaces so that said first seal on said first one of said two like connectors is compressed and pressed against a corresponding seal on said second one of said two like connectors thereby preventing loss of fluid from said two like connectors;
(b) at least one electrical contact having an electrical contact surface located on said mating surface outside of a pressure boundary provided by said first seal, so that when said first like connector is joined to said second like connector, said at least one electrical contact surface on said first like connector makes interconnection with said at least one electrical contact surface on said second like connector;
(c) at least one enclosed pathway communicating fluid pressure from an internal portion of said connector to a portion of said electrical contact opposite said electrical contact surface;
(d) a second seal preventing flow of fluid past said electrical contact, said second seal permitting motion of said electrical contact in a direction having a component normal to said electrical contact surface so that said fluid pressure carried by said enclosed pathway causes said electrical contact to press against an adjacent electrical contact on said second like connector; and
(e) electrical connection means attached to said portion of said electrical contact opposite said electrical contact surface, said electrical connection means passing through at least a portion of said enclosed pathway and through a pressure boundary of said connector, said electrical connection means for connection to said at least one electrical communication line.

12. A connector according to claim 11 wherein said fluid pressure port is circular and said at least one electrical contact is formed as an arcuate member having an arc center at a center of said fluid pressure port so that a pair of mated connectors can maintain electrical contact through a range of relative angular positions.

13. A connector according to claim 12 wherein said at least one electrical contact comprises a set of electrical contacts disposed at a common radius from said center of said fluid pressure port.

14. A connector according to claim 13 wherein said set of electrical contacts comprises two electrical contacts said contacts placed in positions diametrically opposite each other relative to said center of said fluid pressure port.

15. A connector according to claim 11 wherein said electrical connection means is further characterized as including a first electrical conductor connected to said electrical contact and a second electrical conductor passing through said pressure boundary of said connector through a fluid tight seal, said first electrical conductor connected to said second electrical conductor at an electrical junction.

16. A connector according to claim 15 wherein said connector body has an access port for access to said electrical junction so that said first electrical conductor may be replaced and connected to said second electrical conductor.

17. A connector according to claim 16 wherein said access port has a removable fluid tight closure means.

18. A connector according to claim 15 further having a junction chamber for containing said electrical junction, said junction chamber communicating with said fluid pressure communication passage through a relatively small port in an otherwise generally smooth wall so that said first electrical conductor, said second electrical conductor and said electrical junction do not interfere with fluid flow through said connector and so that debris carried by said fluid flow does not damage said first electrical conductor, said second electrical conductor nor said electrical junction.

19. A connector according to claim 11 wherein said connector body is made of a material which is electrically non-conducting.

20. A connector according to claim 11 wherein said connector body is made of a material which conducts electricity, said connector further comprising an insulating insert between said at least one electrical contact and said connector body.

* * * * *